United States Patent
Bae et al.

(10) Patent No.: US 12,115,549 B2
(45) Date of Patent: Oct. 15, 2024

(54) COATING BAR AND METHOD FOR MANUFACTURING SEPARATOR USING THE SAME

(71) Applicant: LG ENERGY SOLUTION, LTD., Seoul (KR)

(72) Inventors: Won-Sik Bae, Daejeon (KR); So-Jung Park, Daejeon (KR); So-Yeong Lee, Daejeon (KR); Jong-Yoon Lee, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/567,694

(22) PCT Filed: Sep. 30, 2022

(86) PCT No.: PCT/KR2022/014858
§ 371 (c)(1),
(2) Date: Dec. 6, 2023

(87) PCT Pub. No.: WO2023/059017
PCT Pub. Date: Apr. 13, 2023

(65) Prior Publication Data
US 2024/0261812 A1    Aug. 8, 2024

(30) Foreign Application Priority Data

Oct. 7, 2021    (KR) .......................... 10-2021-0133531

(51) Int. Cl.
*B05C 1/08* (2006.01)
*B05C 11/10* (2006.01)
*H01M 50/403* (2021.01)

(52) U.S. Cl.
CPC ............ *B05C 1/0808* (2013.01); *B05C 11/10* (2013.01); *H01M 50/403* (2021.01); *B05C 1/0826* (2013.01)

(58) Field of Classification Search
USPC ........ 118/244, 258–262, 414, 304, 206, 118, 118/119; 427/359, 428.14, 371, 58
See application file for complete search history.

(56) References Cited

U.S. PATENT DOCUMENTS

| 4,518,637 A | * | 5/1985 | Takeda ..................... G03C 1/74 118/118 |
| 2015/0118389 A1 | * | 4/2015 | Jang ..................... H01M 50/403 427/58 |

(Continued)

FOREIGN PATENT DOCUMENTS

| JP | 6-170312 A | 6/1994 |
| JP | 9-141177 A | 6/1997 |

(Continued)

OTHER PUBLICATIONS

International Search Report issued in PCT/KR2022/014858 (PCT/ISA/210), mailed on Jan. 25, 2023.

(Continued)

*Primary Examiner* — Yewebdar T Tadesse
(74) *Attorney, Agent, or Firm* — Birch, Stewart, Kolasch & Birch, LLP

(57) ABSTRACT

The present disclosure relates to a coating bar and a method for manufacturing a separator using the same.
The coating bar according to the present disclosure may form a coating layer having an area with different thicknesses by one coating.
Additionally, the method for manufacturing a separator according to the present disclosure includes forming a porous coating layer using a predetermined coating bar, to manufacture a separator including the porous coating layer (Continued)

having an area with different thicknesses. In particular, the present disclosure manufactures the separator having a larger thickness at the two ends than at the center, thereby avoiding a lack of adhesive strength at the two ends in a transverse direction in the adhesion between the separator and the electrode, and exhibiting uniform adhesive strength over the whole interface between the separator and the electrode.

8 Claims, 4 Drawing Sheets

(56) References Cited

U.S. PATENT DOCUMENTS

2015/0171396 A1 6/2015 Okuno
2020/0254474 A1 8/2020 Kim et al.

FOREIGN PATENT DOCUMENTS

| JP | 10-216588 A | 8/1998 |
| JP | 2007-61709 A | 3/2007 |
| JP | 2008-168200 A | 7/2008 |
| JP | WO2013/133025 A1 | 7/2015 |
| JP | 2018-79436 A | 5/2018 |
| JP | 2018-86605 A | 6/2018 |
| JP | 2021-45966 A | 3/2021 |
| JP | 2021-115557 A | 8/2021 |
| KR | 10-2015-0051170 A | 5/2015 |
| KR | 10-2017-0087136 A | 7/2017 |
| KR | 10-2179606 B1 | 11/2020 |
| KR | 10-2306424 B1 | 9/2021 |

OTHER PUBLICATIONS

Written Opinion of the International Searching Authority issued in PCT/KR2022/014858 (PCT/ISA/237), mailed on Jan. 25, 2023.

* cited by examiner

COATING BAR AND METHOD FOR MANUFACTURING SEPARATOR USING THE SAME

TECHNICAL FIELD

The present disclosure relates to a coating bar and a method for manufacturing a separator using the same.

The present application claims priority to Korean Patent Application No. 10-2021-0133531 filed on Oct. 7, 2021 in the Republic of Korea, the disclosure of which is incorporated herein by reference.

BACKGROUND ART

Attention is directed to secondary batteries that can be repeatedly recharged as an alternative to fossil energy. Secondary batteries have been primarily used in traditional handheld devices such as mobile phones, video cameras and electric tools. However, recently, the range of applications is gradually expanding to vehicles (EVs, HEVs, PHEVs) that are powered on electric power, high capacity energy storage systems (ESSs) and uninterrupted power systems (UPSs).

A secondary battery includes an electrode assembly including a positive electrode, a negative electrode and a separator between the positive electrode and the negative electrode, and an electrolyte that electrically and chemically reacts with active materials coated on the positive electrode and the negative electrode. A typical example is a lithium ion secondary battery in which electrochemical reactions occur at the positive electrode and the negative electrode by lithium ions that act as working ions during charging/discharging. In the existing lithium ion secondary battery, to ensure the adhesive strength between the electrode and the separator in the electrode assembly, lamination is applied in an assembly process. The lamination is a process of combining the separator with the electrode. The lamination includes applying pressure and heat to the separator and the electrode stacked on top of each other to adhere them, thereby increasing the adhesive strength between the separator and the electrode.

In general, the positive electrode or the negative electrode is manufactured by coating an active material slurry on a current collector and drying it. However, when the active material slurry is coated on the current collector, as it goes to two ends in the transverse direction, a sliding phenomenon in which the active material slurry flows occurs. Thus, a resulting active material layer has a smaller thickness as it goes to the two ends in the transverse direction.

In relation to this, FIG. 1 shows the common electrode-separator stack structure. As can be seen from FIG. 1, the separator 1 includes a porous coating layer 12 having a uniform thickness on at least one surface of a porous polymer substrate 11, and the electrode 2 includes the active material layer 22 on at least one surface of the current collector 21. The active material layer 22 has a gradual decrease in thickness as it goes to the two ends in the transverse direction. Accordingly, due to the lack of thickness at the two ends of the electrode in the transverse direction, despite the lamination of the separator and the electrode, the adhesive strength is low especially at the two ends in the transverse direction. In worse cases, an adhesion failure between the separator and the electrode occurs.

Meanwhile, known methods for forming a coating layer by coating different materials on a substrate include, for example, gravure coating, reverse roll coating and wire bar coating. Among them, the wire bar coating is easier to manipulate and manage than the other coating methods and achieves thin and uniform coating over a wide area, and thus these advantages make the wire bar coating widely used. Specifically, the wire bar coating method may include feeding a coating solution to a coating bar on which a wire is wound, bringing a substrate and the coating bar into contact with each other and transferring the coating solution onto the substrate while rotating the coating bar, or coating the coating solution on one surface of the substrate, and rotating the coating bar on which the wire is wound.

However, since the coating layer formed using the coating bar is formed with uniform thickness, the wire bar coating method fails to form a coating layer having an area with different thicknesses by one coating.

DISCLOSURE

Technical Problem

The present disclosure is designed to solve the above-described problem, and therefore the present disclosure is directed to providing a predetermined coating bar for forming a coating layer having an area with different thicknesses by one coating. Additionally, the present disclosure is further directed to providing a method for manufacturing a separator using the predetermined coating bar.

It will be apparent that these and other objectives and advantages of the present disclosure can be realized by the means or methods set forth in the appended claims and a combination thereof.

Technical Solution

The inventors found that the above-described problem can be solved by a coating bar as described below and a method for manufacturing a separator using the same.

A first embodiment relates to a coating bar for coating an organic/inorganic slurry on one surface of a substrate, wherein the coating bar includes a cylindrical bar and a wire wound on a surface of the cylindrical bar, the cylindrical bar has a smaller diameter at two ends than a diameter at a center, and a wire diameter of the wire wound at the two ends is larger than a wire diameter of the wire wound at the center.

In the first embodiment, a second embodiment relates to the coating bar, wherein an outer diameter of the coating bar is uniform.

In the first or second embodiment, a third embodiment relates to the coating bar, wherein a length of one of the two ends is 0.1 to 10% of a total length of the coating bar.

In any one of the first to third embodiments, a fourth embodiment relates to the coating bar, wherein the wire diameter of the wire wound at the two ends is larger than the wire diameter of the wire wound at the center by 10% to 100%.

A fifth embodiment relates to a method for manufacturing a separator including preparing a porous polymer substrate; and coating an organic/inorganic slurry comprising a binder polymer and inorganic particles on at least one surface of the porous polymer substrate using the coating bar according to any one of the first to fourth embodiments to form a porous coating layer.

In the fifth embodiment, a sixth embodiment relates to the method for manufacturing a separator, wherein a thickness of the porous coating layer at two ends in a transverse direction is larger than a thickness at a center in the transverse direction.

In the fifth or sixth embodiment, a seventh embodiment relates to the method for manufacturing a separator, wherein a thickness of the porous coating layer at two ends in a transverse direction is larger than a thickness at a center in the transverse direction by 10 to 150%.

In any one of the fifth to seventh embodiments, an eighth embodiment relates to the method for manufacturing a separator, wherein a length of one of the two ends of the porous coating layer is 0.1 to 10% of a total length of the separator in a widthwise direction.

Advantageous Effects

The coating bar according to the present disclosure may form a coating layer having an area with different thicknesses by one coating.

Additionally, the method for manufacturing a separator according to the present disclosure includes forming a porous coating layer using the predetermined coating bar, to manufacture a separator including the porous coating layer having an area with different thicknesses. Specifically, the present disclosure may manufacture the separator having a larger thickness at the two ends than at the center, thereby avoiding the lack of adhesive strength at the two ends in the transverse direction in the adhesion between the separator and the electrode, and exhibiting uniform adhesive strength over the whole interface between the separator and the electrode.

DESCRIPTION OF DRAWINGS

The accompanying drawings illustrate an exemplary embodiment of the present disclosure, and together with the foregoing description of the present disclosure, serve to help a further understanding of the technical aspects of the present disclosure, so the present disclosure should not be construed as being limited to the drawings. Meanwhile, the shape, size, scale or proportion of the elements in the accompanying drawings may be exaggerated to emphasize a more clear description.

BEST MODE

Figure 1:
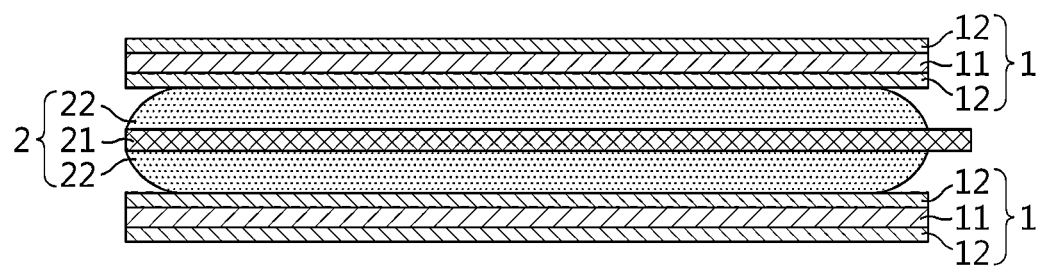
FIG. 1 is a schematic cross-sectional view showing a separator-electrode stack structure according to the related art.

Hereinafter, the present disclosure will be described in detail. It should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation.

The term [comprise(s)] or [include(s)] when used in this specification, specifies the presence of stated elements, but does not preclude the presence or addition of one or more other elements, unless the context clearly indicates otherwise.

The term [about] is used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

Throughout the present specification, A and/or B refers to either A or B or both.

The present disclosure relates to a coating bar and a method for manufacturing a separator using the same. Hereinafter, a detailed description will be provided.

Coating Bar

According to an aspect of the present disclosure, the coating bar of the present disclosure is a coating bar for coating an organic/inorganic slurry on one surface of a substrate, wherein the coating bar includes a cylindrical bar and a wire wound on the surface of the cylindrical bar, the cylindrical bar has a smaller diameter at two ends than a diameter at a center, and a wire diameter of the wire wound at the two ends is larger than a wire diameter of the wire wound at the center.

The coating bar of the present disclosure is used to coat the organic/inorganic slurry on one surface of the substrate, and the coating bar includes the cylindrical bar and the wire wound on the surface of the cylindrical bar.

The substrate may include, but is not limited to, a film, a sheet and a nonwoven fabric made of any material that may be used as a support. For example, the substrate may be a porous polymer substrate that may be used as a substrate of a separator in a secondary battery. The porous polymer substrate is a substrate having a plurality of pores as an ion conducting barrier for blocking the electrical contact between the negative electrode and the positive electrode and allowing ions to pass therethrough. The porous polymer substrate may be made of polyolefin polymer such as polyethylene, polypropylene and polybutylene.

The organic/inorganic slurry is a slurry that may be coated on at least one surface of the substrate, and may include organic compounds and/or inorganics and the components included in the slurry are not limited to particular types.

The common coating bar is formed by winding the wire having uniform wire diameter on the cylindrical bar having uniform diameter. In the process of coating using the coating bar, when a coating solution is received in a space between adjacent wires, the coating layer having uniform thickness may be formed on one surface of the substrate.

However, coating using the common coating bar can form the coating layer uniformly over the wide area, but it is possible to form a coating layer having uniform thickness, but impossible to form a coating layer having an area with different thicknesses.

Accordingly, the inventors intend to provide a coating bar for forming a coating layer having an area with different thicknesses by one coating by changing the design of the coating bar.

According to an embodiment of the present disclosure, the cylindrical bar of the coating bar of the present disclosure has a smaller diameter at the two ends than the diameter at the center, and the wire diameter of the wire wound at the two ends is larger than the wire diameter of the wire wound at the center.

When at least two types of wires having different wire diameters are wound on the cylindrical bar having uniform diameter, an area on which a wire (i.e., a thicker wire) having a larger wire diameter is wound has a larger outer diameter than an area on which a wire (i.e., a thinner wire) having a smaller wire diameter is wound. In this instance, the wire at the area having a larger outer diameter applies higher pressure to the substrate, causing deformation of the substrate.

Accordingly, the present disclosure sets the diameter of the cylindrical bar on which the wire having a larger wire diameter is wound to be smaller than the diameter of the cylindrical bar on which the wire having a smaller wire diameter is wound, to make the pressure applied to the substrate by the coating bar uniform.

Additionally, the present disclosure may adjust the thickness of the organic/inorganic slurry coated on the substrate by changing the thickness of the wire diameter of the wire wound at the two ends and the center of the cylindrical bar.

Specifically, according to the present disclosure, the amount of the organic/inorganic slurry received in the space between adjacent wires wound at the two ends of the cylindrical bar is larger than the amount of the organic/inorganic slurry received in the space between adjacent wires wound at the center of the cylindrical bar. Accordingly, a larger amount of organic/inorganic slurry may be coated at the two ends of the substrate than at the center, and a thicker coating layer may be formed at the two ends of the substrate than at the center.

In particular, the present disclosure changes the design of the two ends of the coating bar. In the present disclosure, the coating bar may include the center and the ends, and an area except the center may be referred to as the two ends. Specifically, the length of one of the two ends may be approximately 0.1 to 10% or approximately 0.2 to 5% of the total length of the coating bar.

According to a specific embodiment of the present disclosure, the outer diameter of the coating bar may be approximately uniform.

The outer diameter of the coating bar refers to the outer diameter of the coating bar measured at the location at which the wire is wound. That is, the outer diameter of the coating bar corresponds to twice the sum of the radius of the cylindrical bar and the wire diameter of the wire. Additionally, [uniform] outer diameter indicates that the outer diameter of the coating bar at the two ends and the center is uniform, or the outer diameter of the coating bar at the two ends and the center is substantially equal, or the outer diameter of the coating bar at the two ends and the center is substantially equal within the error range when measured. Specifically, the diameter of the cylindrical bar and the wire diameter of the wire at the two ends and the center of the coating bar of the present disclosure may be different, but the outer diameter of the coating bar may be uniform. That is, the diameter of the cylindrical bar may be larger at the center and smaller at the two ends, and accordingly, the wire diameter of the wire wound at the two ends of the cylindrical bar may be larger than the wire diameter of the wire wound at the center of the cylindrical bar.

Figure 2:
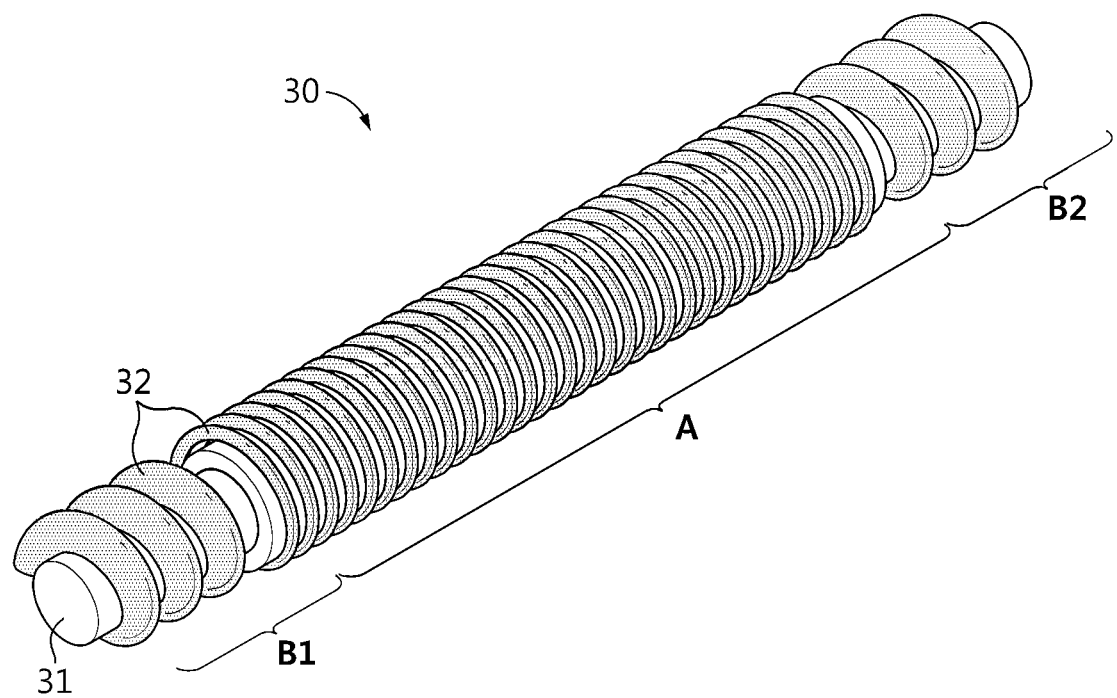
FIG. 2 is a schematic cross-sectional view showing a structure of a coating bar according to the present disclosure.
Figure 3:
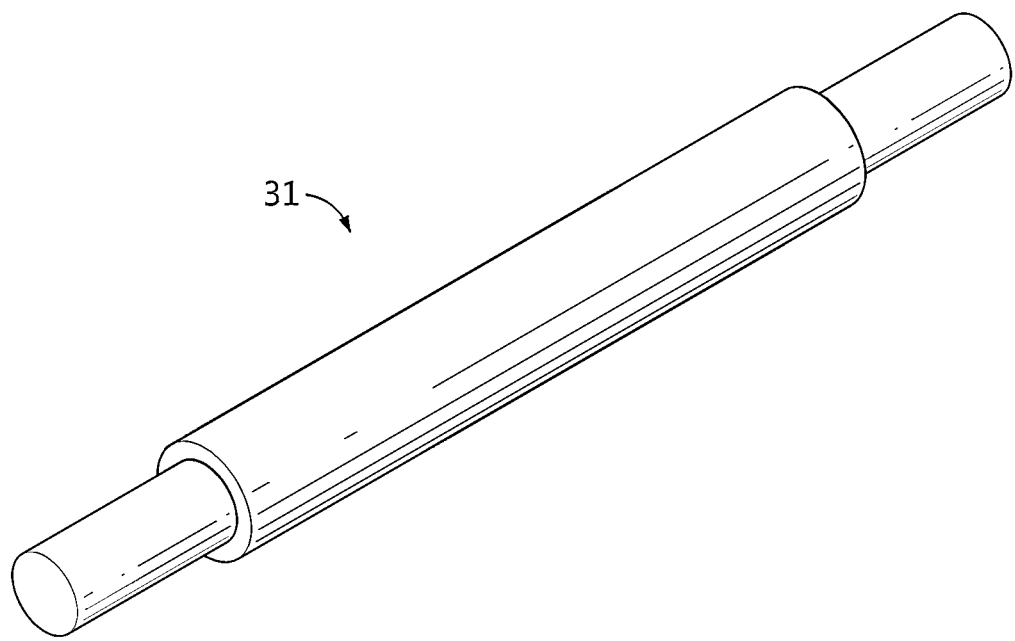
FIG. 3 is a schematic cross-sectional view showing a structure of a cylindrical bar included in a coating bar according to the present disclosure.

FIG. 2 schematically shows the structure of the coating bar according to an embodiment of the present disclosure. Additionally, FIG. 3 schematically shows the cylindrical bar of the coating bar according to an embodiment of the present disclosure. FIG. 2 shows the coating bar 30 including the wire 32 wound on the cylindrical bar 31 according to FIG. 3, and the wire having a larger wire diameter is wound at the two ends B1 and B2, and the wire a smaller wire diameter is wound at the center A to make the outer diameter uniform.

Meanwhile, according to a specific embodiment of the present disclosure, the wire diameter of the wire wound at the two ends may be larger than the wire diameter of the wire wound at the center by approximately 10% to 100% or 20 to 80%. When a difference between the wire diameters of the wires wound at the center and the ends of the cylindrical bar corresponds to the above-described range, the thickness of the organic/inorganic slurry coated at the two ends and the center of the substrate may be adjusted within an optimal range.

Additionally, according to a specific embodiment of the present disclosure, in the present disclosure, the cylindrical bar has a smaller diameter at the two ends than the diameter at the center, and the diameter of the cylindrical bar at the two ends may be determined according to the thickness of the wire diameter of the wire wound at the two ends. In particular, for uniform outer diameter of the coating bar, the diameter of the cylindrical bar at the two ends and the center may be determined in reliance on the thickness of the wire diameter of the wire. For example, the diameter of the cylindrical bar at the two ends may be smaller than the diameter at the center by approximately 0.5 to 10%, or 1 to 5%. When a difference in diameter of the cylindrical bar at the two ends and the center corresponds to the above-described range, it is possible to minimize the pressure applied to the substrate by the coating bar when coating the organic/inorganic slurry on one surface of the substrate, thereby preventing deformation of the substrate.

Method for Manufacturing a Separator

According to an aspect of the present disclosure, a method for manufacturing a separator according to the present disclosure includes:

preparing the porous polymer substrate; and coating the organic/inorganic slurry comprising a binder polymer and inorganic particles on at least one surface of the porous polymer substrate using the coating bar according to an embodiment of the present disclosure to form a porous coating layer.

In particular, in the present disclosure, when forming the porous coating layer, the thickness of the porous coating layer at the two ends may be adjusted by coating the organic/inorganic slurry on at least one surface of the porous polymer substrate using the coating bar according to an embodiment of the present disclosure as described above. Specifically, after the organic/inorganic slurry is fed to the coating bar according to an embodiment of the present disclosure, the organic/inorganic slurry may be transferred onto the porous polymer substrate while rotating the coating bar in contact with one surface of the porous polymer substrate, to form the porous coating layer on one surface of the porous polymer substrate. Alternatively, after the organic/inorganic slurry is applied to at least one surface of the porous polymer substrate, the organic/inorganic slurry may be coated with the movement of the polymer substrate along the coating direction while rotating the coating bar according to an embodiment of the present disclosure on the organic/inorganic slurry, to form the porous coating layer on one surface of the porous polymer substrate.

The separator manufactured by the common manufacturing method has an insufficient adhesive strength with the electrode due to the lack of adhesive strength at the two ends, but the present disclosure provides the method for manufacturing a separator including selectively increasing only the thickness of the porous coating layer at the two ends, thereby solving the problem with the lack of adhesive strength at the two ends, and ensuring a sufficient adhesive strength in the lamination of the separator and the electrode.

In case that the amount of the binder polymer increases or a separate adhesive layer is formed to ensure the adhesive strength between the separator and the electrode, the resistance of the battery cell increases or the thickness of the separator increases, causing capacity loss of the battery cell. However, the separator of the present disclosure has a larger thickness of the porous coating layer at the two ends in the transverse direction than at the center in the transverse direction to avoid capacity loss of the secondary battery.

Figure 4:
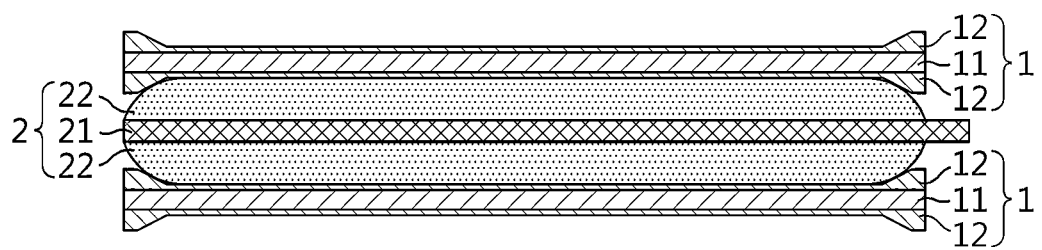
FIG. 4 is a schematic cross-sectional view showing an example of a stack structure of an electrode and a separator manufactured according to the present disclosure.

According to a specific embodiment of the present disclosure, as shown in FIG. 4, the porous coating layer may have a larger thickness at the two ends in the transverse direction than at the center in the transverse direction.

For example, the thickness of the porous coating layer at the two ends in the transverse direction may be larger than the thickness at the center in the transverse direction by approximately 10 to 150% or approximately 30 to 80%. Alternatively, the two ends of the porous coating layer in the transverse direction may include an area with its thickness gradually increasing along a direction facing away from the center in the transverse direction. The present disclosure sets the thickness of the porous coating layer at the two ends in the transverse direction to be larger than the thickness at the center in the transverse direction, thereby solving the problem with the lack of adhesive strength at the two ends in the transverse direction and ensuring a sufficient adhesive strength in the lamination of the separator and the electrode.

According to a specific embodiment of the present disclosure, the length of one of the two ends of the porous coating layer may be approximately 0.1 to 10%, or approximately 0.2 to 5% of the total length of the substrate in the widthwise direction. When the ends are set to have the above-described range of lengths, it is possible to prevent a reduction in adhesive strength with the electrode and exhibit a uniform adhesive strength over the whole interface between the electrode and the separator.

In the present disclosure, the porous polymer substrate refers to a substrate having a plurality of pores as described above. The pores are connected to each other to allow gases or liquids to pass through the substrate from one surface to the other surface. The porous polymer substrate may include a porous polymer film comprising a thermoplastic resin from the perspective of a shut down function. Here, the shut down function refers to a function for preventing thermal runaway of the battery by closing the pores of the porous substrate to block the ion movement as the thermoplastic resin melts with the increasing battery temperature. The melting point of the thermoplastic resin is preferably less than approximately 200° C. in terms of the shut down function.

The porous polymer substrate is not limited to a particular thickness, but specifically, the thickness of the porous polymer substrate is approximately 1 to 100 μm, and more specifically, approximately 5 to 50 μm or approximately 5 to 30 μm, and the porous polymer substrate is not limited to a particular porosity, but the porosity of the porous polymer substrate is preferably approximately 10 to 95% or approximately 35 to 65%.

In the present disclosure, the inorganic particles are packed in contact with each other and held together by the binder polymer within the porous coating layer, to form an interstitial volume therebetween, defining a void space which forms pores.

Additionally, in the present disclosure, specifically, a weight ratio of the inorganic particles and the binder polymer in the porous coating layer may be 99:1 to 50:50.

In the present disclosure, the binder polymer is not limited to a particular type, and may include any type of binder polymer capable of providing bond strength between the inorganic particles and bond strength between the porous coating layer and the electrode. For example, the binder polymer may include at least one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, poly (methyl)methacrylate, polyethyl(meth)acrylate, poly n-propyl (meth)acrylate, poly isopropyl (meth)acrylate, poly n-butyl (meth)acrylate, poly t-butyl (meth)acrylate, poly sec-butyl (meth)acrylate, poly pentyl (meth)acrylate, poly 2-ethylbutyl poly (meth)acrylate, poly 2-ethylhexyl (meth)acrylate, poly n-octyl (meth)acrylate, poly isooctyl (meth)acrylate, poly isononyl (meth)acrylate, poly lauryl (meth)acrylate, poly tetradecyl (meth)acrylate, poly N-vinyl pyrrolidone, polyacrylonitrile, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide.

Additionally, the binder polymer may be a particulate binder polymer resin, for example, at least one of an acrylic copolymer or a styrene butadiene rubber. The acrylic copolymer may include at least one of ethylhexyl acrylate-co-methyl methacrylate, polymethylmethacrylate, polyethylhexyl acrylate, polybutylacrylate, polyacrylonitrile or butylacrylate-co-methylmethacrylate.

In the present disclosure, the inorganic particles are not limited to a particular type and may include electrochemically stable ones. For example, the inorganic particles are not limited to a particular type and may include any type of inorganic particles that do not cause oxidation and/or reduction reaction in the operating voltage range (for example, 0~5V vs Li/Li+) of electrochemical devices used, and non-limiting examples of the inorganic particles may include at least one of $ZrO_2$, $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$. AlOOH, $Al(OH)_3$ or SiC. In addition to the foregoing, the inorganic particles may further include at least one of lithiumphosphate ($Li_3PO_4$), lithium-titaniumphosphate ($Li_xTi_y(PO_4)_3$, $0<x<2$, $0<y<3$), lithiumaluminumtitanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithiumnitride ($Li_xN_y$, $0<x<4$, $0<y<2$), $SiS_2$ based glass ($Li_xSi_yS_z$, $0<x<3$, $0<y<2$, $0<z<4$) or $P_2S_5$ based glass ($Li_xP_yS_z$, $0<x<3$, $0<y<3$, $0<z<7$).

Hereinafter, the present disclosure will be described in detail through examples. However, the examples according to the present disclosure may be modified in many other forms, and the scope of the present disclosure should not be construed as being limited to the following examples. The examples of the present disclosure are provided to fully explain the present disclosure to those having ordinary knowledge in the technical field to which the present disclosure pertains.

EXAMPLE

Each example and comparative example are prepared by the following method.

Each example and comparative example are prepared by the following method. Hereinafter, the example and comparative example will be described with reference to FIG. 2 and Tables 1 and 2.

Example 1

A polyethylene porous substrate (thickness 9 μm, porosity: 45%), polyvinylidene fluoride as a binder polymer and alumina ($Al_2O_3$) (particle size: 500 nm) as inorganic particles are added to acetone as a solvent to prepare a slurry.

The slurry is coated on one surface of the porous substrate using a coating bar and dried to manufacture a separator.

In this instance, the coating bar used has the structure as shown in FIG. 2. The total length of the coating bar is 250 mm, the center (A) is 200 mm, and each of the two ends (B1 and B2) is 25 mm. The outer diameter of the coating bar used is uniform, the diameter of the cylindrical bar at the center (A) is 12.7 mm, the wire diameter of the wire wound on the cylindrical bar at the center (A) is 0.4 mm, the diameter of the cylindrical bar at the two ends (B1 and B2) is 12.5 mm, and the wire diameter of the wire wound on the cylindrical bar at the two ends (B1 and B2) is 0.5 mm.

Example 2 and Comparative Examples 1, 2

A separator is manufactured by the same method as example 1, and the slurry is coated by changing the diameter of the cylindrical bar at the center (A) and the two ends (B1 and B2) of the coating bar and the wire diameter of the wire wound thereon as shown in the following table 1.

TABLE 1

|  | Center (A location) | | | | Two ends (B1 and B2 locations) | | | |
| --- | --- | --- | --- | --- | --- | --- | --- | --- |
|  | Diameter of cylindrical bar | Wire diameter of wire | Thickness of porous coating layer | Thickness of separator | Diameter of cylindrical bar | Wire diameter of wire | Thickness of porous coating layer | Thickness of separator |
| Example 1 | 12.7 mm | 0.4 mm | 3.2 μm | 12.2 μm | 12.5 mm | 0.5 mm | 4.5 μm | 13.5 μm |
| Example 2 | 12.7 mm | 0.4 mm | 3.3 μm | 12.3 μm | 12.3 mm | 0.6 mm | 5.3 μm | 14.3 μm |
| Comparative example 1 | 12.7 mm | 0.4 mm | 3.2 μm | 12.2 μm | 12.7 mm | 0.4 mm | 3.2 μm | 12.2 μm |
| Comparative example 2 | 12.7 mm | 0.5 mm | 4.3 μm | 13.3 μm | 12.7 mm | 0.5 mm | 4.3 μm | 13.3 μm |

TABLE 2

|  | Electrode adhesive strength (A location) | Electrode adhesive strength (B1 and B2 locations) |
| --- | --- | --- |
| Example 1 | 62 gf/25 mm | 59 gf/25 mm |
| Example 2 | 59 gf/25 mm | 67 gf/25 mm |
| Comparative example 1 | 65 gf/25 mm | 11 gf/25 mm |
| Comparative example 2 | 78 gf/25 mm | 17 gf/25 mm |

Specifically, the electrode adhesive strength (Lami strength, gf/25 mm) is evaluated by the following method. An active material [natural graphite and artificial graphite (weight ratio 5:5)], a conductive material [super P] and a binder [polyvinylidene fluoride (PVdF)] are mixed at a weight ratio of 92:2:6, dispersed in water, and coated on a copper foil 250 mm in width to manufacture a negative electrode.

The separator having the width of 250 mm is prepared as manufactured in examples 1 to 2 and comparative examples 1 to 2.

The separator and negative electrode as prepared are stacked and interposed between 100 μm thick PET films and adhered using a roll lamination machine. In this instance, the conditions of the roll lamination machine include adhesion at 60° C. under the pressure of 2.4 kgf/mm at a rate 5 m/min.

The separator and negative electrode adhered to each other are tailored such that the center (A) and the two ends (B1 and B2) are 25 mm in width and 70 mm in length, the end of the separator and negative electrode is mounted on UTM equipment (Instron), and a force is applied 180° at the measurement rate of 300 mm/min to measure a force necessary to separate the negative electrode from the separator adhered to the negative electrode.

DESCRIPTION OF REFERENCE NUMERALS

1: Separator
11: Porous polymer substrate
12: Porous coating layer
2: Electrode
21: Current collector
22: Active material layer
30: Coating bar
31: Cylindrical bar
32: Wire
A: Center
B1, B2: End

What is claimed is:

1. A coating bar for coating an organic/inorganic slurry on one surface of a substrate, the coating bar comprising:
   a cylindrical bar; and
   a wire wound on a surface of the cylindrical bar,
   wherein the cylindrical bar has a smaller diameter at two ends than a diameter at a center, and
   a wire diameter of the wire wound at the two ends is larger than a wire diameter of the wire wound at the center.

2. The coating bar according to claim 1, wherein an outer diameter of the coating bar is uniform.

3. The coating bar according to claim 1, wherein a length of one of the two ends is 0.1 to 10% of a total length of the coating bar.

4. The coating bar according to claim 1, wherein the wire diameter of the wire wound at the two ends is larger than the wire diameter of the wire wound at the center by 10% to 100%.

5. A method for manufacturing a separator, comprising:
   preparing a porous polymer substrate; and coating an organic/inorganic slurry comprising a binder polymer and inorganic particles on at least one surface of the porous polymer substrate using the coating bar according to claim 1 to form a porous coating layer.

6. The method for manufacturing a separator according to claim 5, wherein a thickness of the porous coating layer at two ends in a transverse direction is larger than a thickness at a center in the transverse direction.

7. The method for manufacturing a separator according to claim 5, wherein a thickness of the porous coating layer at two ends in a transverse direction is larger than a thickness at a center in the transverse direction by 10 to 150%.

8. The method for manufacturing a separator according to claim 5, wherein a length of one of the two ends of the porous coating layer is 0.1 to 10% of a total length of the separator in a widthwise direction.

* * * * *